US006970921B1

(12) United States Patent
Wang et al.

(10) Patent No.: US 6,970,921 B1
(45) Date of Patent: Nov. 29, 2005

(54) NETWORK INTERFACE SUPPORTING VIRTUAL PATHS FOR QUALITY OF SERVICE

(75) Inventors: Chi-Lie Wang, Sunnyvale, CA (US); Li-Jau Yang, San Jose, CA (US); Kap Soh, Fremont, CA (US); Chin-Li Mou, San Jose, CA (US)

(73) Assignee: 3Com Corporation, Santa Clara, CA (US)

( * ) Notice: Subject to any disclaimer, the term of this patent is extended or adjusted under 35 U.S.C. 154(b) by 878 days.

(21) Appl. No.: 09/916,377

(22) Filed: Jul. 27, 2001

(51) Int. Cl.[7] .......................................... G06F 15/177
(52) U.S. Cl. ...................... 709/220; 709/218; 709/232; 709/249; 709/250
(58) Field of Search .............................. 709/218, 220, 709/232, 249, 250

(56) References Cited

U.S. PATENT DOCUMENTS

| 4,783,730 | A |   | 11/1988 | Fischer ........................ 364/200 |
| 5,121,383 | A |   | 6/1992  | Golestani ..................... 370/60 |
| 5,828,835 | A |   | 10/1998 | Isfeld et al. ............. 395/200.3 |
| 5,835,724 | A | * | 11/1998 | Smith ......................... 709/227 |
| 5,838,915 | A |   | 11/1998 | Klausmeier et al. ... 395/200.45 |
| 5,933,413 | A | * | 8/1999  | Merchant et al. ............ 370/234 |
| 5,953,341 | A | * | 9/1999  | Yamanaka et al. .......... 370/416 |
| 6,026,090 | A | * | 2/2000  | Benson et al. ............ 370/395.7 |
| 6,052,375 | A |   | 4/2000  | Bass et al. |
| 6,070,219 | A | * | 5/2000  | McAlpine et al. .......... 710/263 |
| 6,151,321 | A | * | 11/2000 | Benson et al. ......... 370/395.42 |
| 6,199,137 | B1| * | 3/2001  | Aguilar et al. ............... 710/305 |
| 6,226,680 | B1|   | 5/2001  | Boucher et al. ............. 709/230 |
| 6,246,691 | B1|   | 6/2001  | Briem et al. ................. 370/412 |
| 6,247,061 | B1| * | 6/2001  | Douceur et al. ............ 709/240 |
| 6,286,052 | B1|   | 9/2001  | McCloghrie et al. |
| 6,728,265 | B1|   | 4/2004  | Yavatkar et al. |

* cited by examiner

Primary Examiner—Jeffrey Gaffin
Assistant Examiner—M. Farooq
(74) Attorney, Agent, or Firm—Mark A. Haynes; Haynes Beffel & Wolfeld LLP

(57) ABSTRACT

A plurality of virtual paths in a network interface between a host port and a network port are managed according to respective priorities. Thus, multiple levels of quality of service are supported through a single physical network port. Variant processes are applied for handling packets which have been downloaded to a network interface, prior to transmission onto the network. The network interface also includes memory used as a transmit buffer, that stores data packets received from the host computer on the first port, and provides data to the second port for transmission on the network. A control circuit in the network interface manages the memory as a plurality of first-in-first-out FIFO queues having respective priorities. Logic places a packet received from the host processor into one of the plurality of FIFO queues according to a quality of service parameter associated with the packets. Logic transmits the packets in the plurality of FIFO queues according to respective priorities. The transmit packet buffer may be statically or dynamically allocated memory.

30 Claims, 13 Drawing Sheets

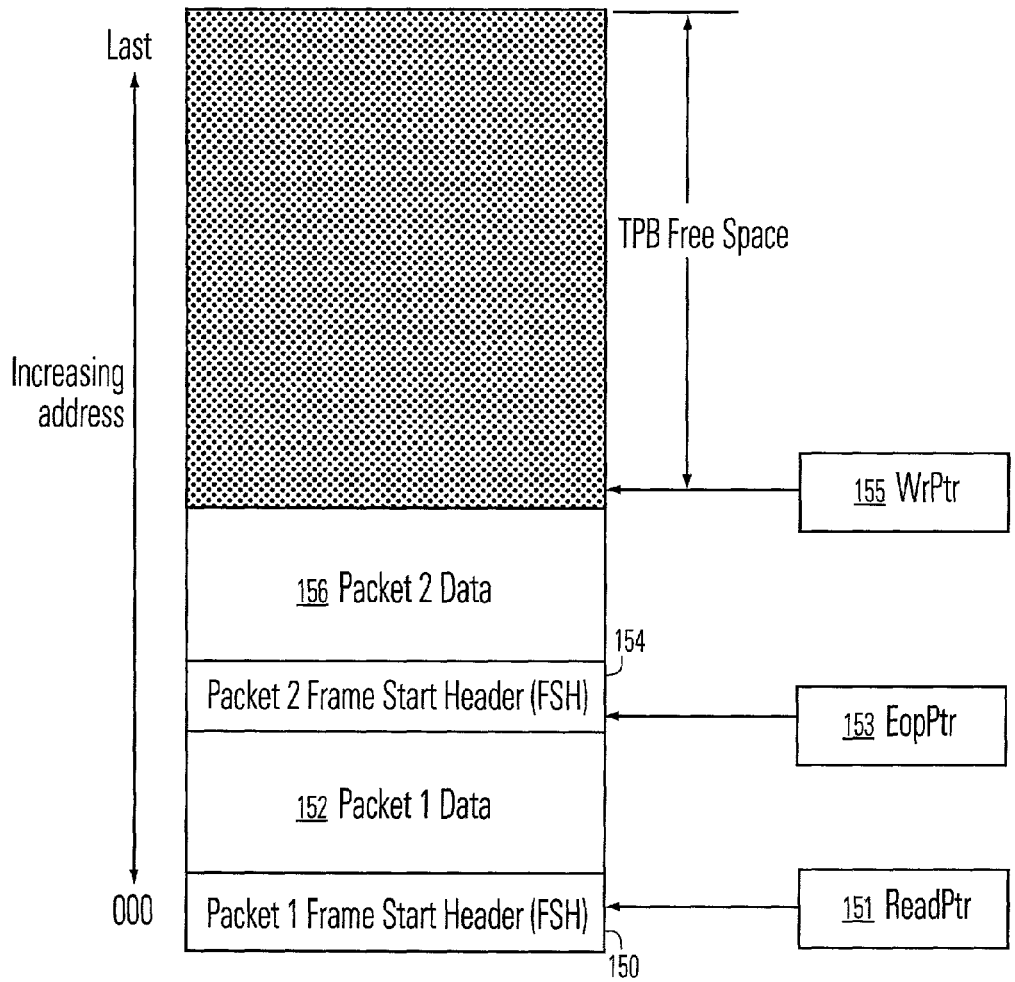

FIG. 3

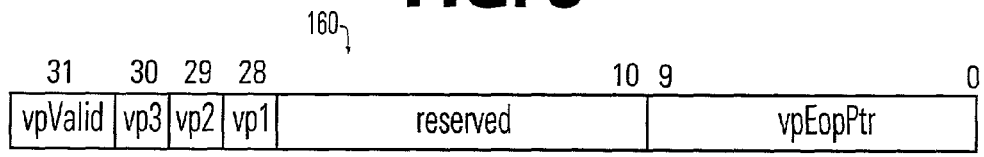

bit 31: vpValid - set to one to indicate a valid packet has been downloaded into the virtual path.
bit 30: vp3 - set to one to indicate that virtual path 3 should be used to store downloaded packet.
bit 29: vp2 - set to one to indicate that virtual path 2 should be used to store downloaded packet.
bit 28: vp1 - set to one to indicate that virtual path 1 should be used to store downloaded packet.
bit 9-0: EopPtr - indicate where the packet ends.

FIG. 4

| 31 | 30 | 23 | 22 | 7 | 6 | 0 |
|---|---|---|---|---|---|---|
| lastBuf | Reserved | | bufferAddress | | bufferLength | | bit 31: lastBuf - set to indicate the last buffer within a packet.
bit 22 - 7: bufferAddress - indicate the starting location of each buffer.
bit 6 - 0 : bufferLength - indicate the length of each buffer if it is not the last buffer. Otherwise, indicate where the packet ends.

NETWORK INTERFACE SUPPORTING VIRTUAL PATHS FOR QUALITY OF SERVICE

RELATED APPLICATION

This application is related to commonly owned U.S. patent application Ser. No. 09/451,395, entitled "FIFO-BASED NETWORK INTERFACE SUPPORTING OUT-OF-ORDER PROCESSING", filed 30 Nov. 1999, inventors Chi-Lie Wang, Li-Jau Yang, Ngo Thanh Ho; and commonly owned U.S. patent application Ser. No. 09/916,715, entitled "NETWORK INTERFACE SUPPORTING OF VIRTUAL PATHS SUPPORTING QUALITY OF SERVICE WITH DYNAMIC BUFFER ALLOCATION", filed on the same day as the present application, by inventors Chi-Lie Wang, Li-Jau Yang, Kap Soh and Chin-Li Mou.

BACKGROUND OF THE INVENTION

1. Field of the Invention

The present invention relates to computer networks and to interface devices for connecting host computers to networks. More particularly, the present invention relates to managing transmission of traffic by network interface cards (NICs) with a plurality of virtual paths, in network connected systems.

2. Description of Related Art

Computer systems often include network interfaces that support high speed data transfers between a host computer and a data network. Such computer systems include an adapter commonly termed a Network Interface Card, or Chip, (NIC). Such adapters typically connect to a host processor via a bus such as the well known PCI, PCMCIA etc.

NICs typically have semiconductor read-write random access memory arrays (RAM) so that data transfers to and from the host memory are anisochronous to transfers to and from the network. Such RAM is typically arranged as a transmit first-in-first-out (FIFO) buffer and a receive FIFO buffer. Thus, packets coming into the NIC, from the host memory, are stored in a transmit FIFO buffer pending transmission onto the network. Conversely, packets coming into the NIC from the network are stored in a receive FIFO buffer, pending transfer into the host memory.

As computer networks are adapted to carry a variety of types of traffic, network protocols are being developed to support variant processing of packets as they traverse the network. Thus, priority packets are developed which are suitable for carrying real-time video or audio signals. These priority packets are processed ahead of other packets in sequence when possible to improve the throughput and reduce the latency of processing for this class of packet. Also, network security is supported for some types of packets. Thus, the Internet security IPSec protocols are being developed. (Request For Comments, 2401 Security Architecture for the Internet Protocol, Internet Engineering Task Force). According to security protocols, the payload and/or the header and other control data associated with the packet are protected using authentication and encryption processes. Accordingly, a variety of priority schemes and other schemes involving processing of packets according to particular processes like encryption through the network have been developed.

The FIFO structure in network interface cards suffers the disadvantage that it is inflexible in the sequence of processing of packets being transferred through the interface, that is, a FIFO structure supports only sequential data transfer. Each packet being loaded will be unloaded through the same sequence determined by the order of receipt of the packet into a typical FIFO-based network interface. Therefore, the processing of packets according to protocols which may benefit from processing out of order must be executed before the packets are delivered to the network interface, or after the packets leave the network interface. The U.S. patent application Ser. No. 09/451,395, entitled "FIFO-BASED NETWORK INTERFACE SUPPORTING OUT-OF-ORDER PROCESSING", filed 30 Nov. 1999, inventors Chi-Lie Wang, Li-Jau Yang, Ngo Thanh Ho, referred to above describes one approach to improving the flexibility of network interface devices.

Accordingly, it is desirable to provide techniques for improving the flexibility of network interfaces.

SUMMARY OF THE INVENTION

The present invention provides for a plurality of virtual paths in a network interface between a host port and a network port which are managed according to respective priorities. Thus, multiple levels of quality of service are supported through a single physical network port. Accordingly, variant processes are applied for handling packets which have been downloaded to a network interface, prior to transmission onto the network. Embodiments of the invention include a computer system that comprises a network interface supporting virtual paths, a method for managing network interfaces according to virtual paths, and an integrated circuit including network interface logic supporting virtual paths.

Thus, one embodiment of the invention is a computer system which comprises a host processor and a network interface coupled to the host processor. The network interface includes a first port that receives packets of data from the host processor, and second port that transmits the packets to the connected network. The network is a packet based network, such as Ethernet and other protocols specified by the IEEE 802.x standards, and Infiniband specified by the Infiniband Trade Association.

The network interface also includes memory used as a transmit buffer, that stores data packets received from the host computer on the first port, and provides data to the second port for transmission on the network. A control circuit in the network interface manages the memory as a plurality of first-in-first-out FIFO queues (or other buffer organizations) having respective priorities. Logic places a packet received from the host processor into one of the plurality of FIFO queues according to a quality of service parameter associated with the packets. Logic transmits the packets in the plurality of FIFO queues according to respective priorities.

The quality of service parameter associated with the packet to be transmitted is provided by a process in the host processor, or upstream from the host processor, in some embodiments of the invention. In one embodiment, the quality of service parameter comprises a code in a frame start header for the packet.

In one embodiment, the plurality of FIFO queues include a higher priority queue, used for example as a virtual path for real-time data traffic. Also, the plurality of FIFO queues includes an intermediate priority queue, used for example as a virtual path for normal traffic. Finally, the plurality of FIFO queues includes a lower priority queue, used for example as a virtual path for packets which require security processing on the network interface prior transmission. Thus, use of the lower priority queue prevents so-called head of line blocking of packet transmission.

The logic which manages the plurality of FIFO queues maintains a first timeout timer coupled with the intermediate priority queue which is enabled if a packet is stored in the intermediate priority queue and expires after a first timeout interval. Logic preempts the higher priority queue in favor of the intermediate priority queue if the first timeout timer expires. A second timeout timer is coupled with the lower priority queue. The second timeout timer is enabled if a packet is stored in the lower priority queue and expires after a second timeout interval. Logic preempts the higher priority queue and the intermediate priority queue in favor of the lower priority queue if the second timeout timer expires. In addition, in one embodiment, logic is provided to service the intermediate priority queue in favor of the lower priority queue, if both the first and second timeout timers expire.

The plurality of FIFO queues may be operated using statically allocated memory, or dynamically allocated memory in various embodiments of the invention. In one embodiment, the memory includes a first storage array for the higher priority FIFO queue, a second storage array for the intermediate priority FIFO queue, and a third storage array for the lower priority FIFO queue. The first, second and third storage arrays have respective inputs coupled to the logic that places the packets in the plurality of FIFO queues, and have respective outputs. Logic to transmit the packets on the network includes a multiplexer coupled to the outputs of the first, second and third storage arrays, by which the plurality of queues share a single network port Other aspects and advantages of the present invention can be seen upon review of the figures, the detailed description, and the claims which follow.

BRIEF DESCRIPTION OF THE FIGURES

FIG. 3 illustrates data structures used in the FIFO based transmit packet buffer (TPB) with virtual paths in the system of FIG. 2.

FIG. 4 illustrates a frame start header format used in the FIFO based transmit packet buffer (TPB) with virtual paths in the system of FIG. 2.

DETAILED DESCRIPTION

A detailed description of embodiments of the present invention is presented with reference to FIGS. 1 through 15.

Figure 1:
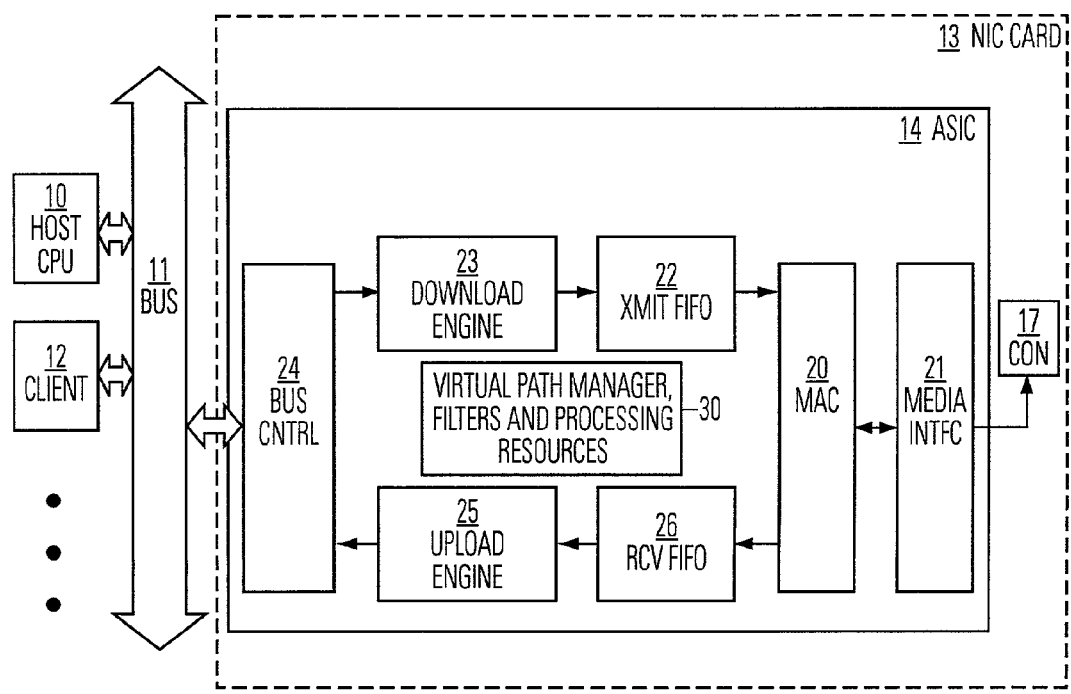
FIG. 1 is a simplified diagram of a computer system including the network interface of the present invention.

FIG. 1 provides a basic structural diagram of an embodiment of a computer system having a host CPU 10 coupled to a bus system 11, such as a PCI or Infiniband bus. The bus 11 interconnects a plurality of bus clients, including clients 12 and the NIC 13 shown with expanded functional blocks. The NIC 13 includes an application specific integrated circuit (ASIC) 14. The ASIC 14 includes network interface functions for a gigabit ETHERNET interface in this particular embodiment. Other embodiments provide interfaces to other types of the network media and protocols, including Infiniband for example. In addition to the ASIC 14, other components are interconnected by and supported by the circuit board of the NIC 13. For example, a BIOS ROM (not shown), and a connector 17 to the LAN (not shown) may be found on the circuit board of the NIC 13.

The ASIC 14 may be coupled to the host by other data paths. Also, the ASIC may be on the same board (motherboard) as the host. Further, the ASIC may be implemented as a module in a highly integrated system-on-a-chip design.

The ASIC 14 includes a MAC structure 20 coupled to medium interface circuitry 21 for connection to connector 17, for example any of a variety of known connectors for electronic or optical links. Other embodiments support wireless ports, and include radios and antennas. The MAC structure 20 is also coupled to a FIFO based transmit packet buffer (TPB) 22 which is driven by a download engine 23 embodied on the ASIC 14. The download engine 23 is coupled to a bus controller 24. The bus controller 24 is also coupled to an upload engine 25. The upload engine 25 is coupled to a FIFO based receive packet buffer 26 which is connected to the MAC structure 20. In FIG. 1, the arrows on the lines connecting the boxes 20, 21, 22, 23, 24, 25 and 26 indicate the directions of data flow. Thus, the illustration of the ASIC 14 includes ordinary elements of a network interface controller chip.

Still referring to FIG. 1, the ASIC 14 further includes filters and data processing resources 30 coupled to packet buffers 22 and 26, and to the upload and download engines 24 and 25, for managing the transferring of packets through the packet buffers, and particularly the management of virtual paths as described in detail below.

Virtual paths are used on the NIC to provide for management of a variety of levels of quality of service for packet transmission on a single physical network port. Packets normally get transmitted from a transmit packet buffer (TPB) in the same order as they are downloaded. However, there are various traffic types to be serviced. Some traffic types, such as real time audio or video, require immediate attention in the NIC. Other traffic types for example, such as IPSec packets, need to go through an encryption process, and are not transmitted until the security processing is done. In order to support quality of service levels, virtual paths in the TPB are used to handle various traffic types. High priority traffic can be transmitted out first through a high priority virtual path. Normal traffic will follow, using a normal priority virtual path. Finally, IPSec packets which may need to go through crypto engine for encryption, hashing, or other security processing will be transmitted out last to prevent head of line blocking.

In order to avoid starvation and guarantee forward progress, virtual path timeout counters are used on normal priority and low priority virtual paths. As soon as any of the packets are downloaded into these virtual paths, the timeout counter for the corresponding virtual path will start counting down. If the packets in these virtual paths cannot be transmitted out in time before the timeout occurs, higher priority traffic will be preempted in order to handle lower priority traffic.

Figure 2:
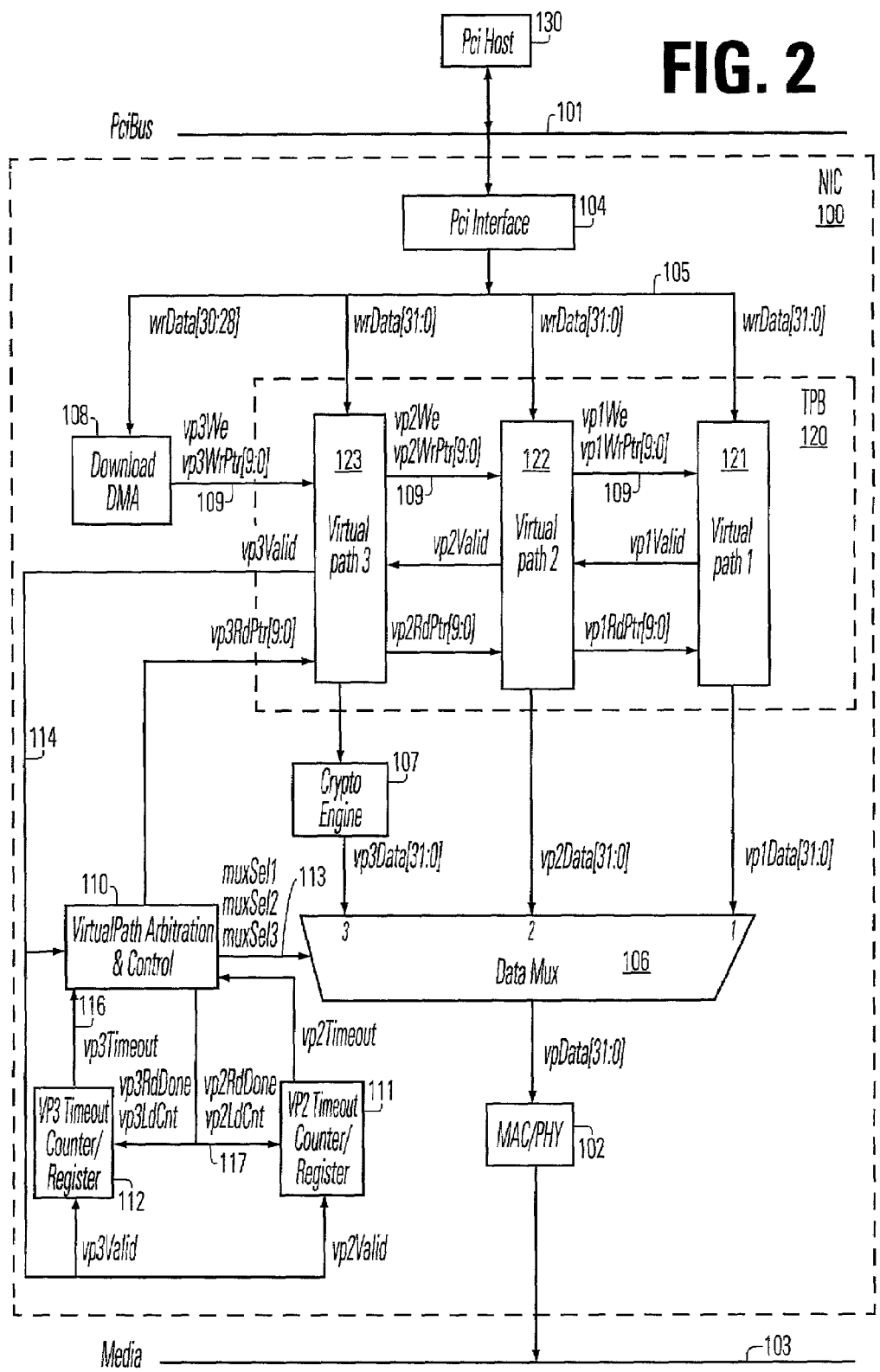
FIG. 2 provides a simplified block diagram of an integrated circuit supporting virtual paths according to the present invention.

FIG. 2 provides a conceptual diagram of a system implementing the invention, including a host CPU 130 coupled to a PCI bus 101 and an integrated circuit 100 (such as ASIC 14 in FIG. 1) including the logical circuitry for transferring data packets into and out from a TPB 120 according to the present invention. The system includes a medium access control and physical layer circuit MAC/PHY block 102, which is coupled to the network medium 103. For simplicity, only parts of the circuit that relate to the host-to-LAN transfer (data transmit) direction are shown.

In this example, the host bus 101 is implemented as a PCI bus. The integrated circuit 1100 includes a PCI interface block 104 between the bus 101, and a internal data bus 105. The internal data bus 105 is coupled to the transmit packet buffer 120. The transmit packet buffer 120 includes a first storage array 121, a second storage array 122, and a third storage array 123, which are statically allocated extents of storage used for first, second and third FIFO queues. The first, second and third FIFO queues are used for respective virtual paths between the host PCI bus 101, and the network port served by the MAC/PHY block 102.

The first, second and third storage arrays 121, 122, 123 have respective inputs coupled to the internal bus 105. Likewise, the first, second and third storage arrays 121, 122, 123 have respective outputs which are coupled to a data multiplexer 106. The first, second and third storage arrays are preferably allocated statically to the respective virtual paths, although dynamic memory allocation could be used. The output of the data multiplexer 106 is coupled to the MAC/PHY block 102. In this embodiment, the output of the third storage array 123 is coupled to the data multiplexer 106 via an engine 107 which executes an encryption or hashing process for network security, such as the encryption processes used according to the IPSec standard. In alternative embodiments, a single storage array may be shared among a plurality of virtual paths, with statically or dynamically allocated address space. In one statically allocated embodiment, statically allocated extents of addresses are accessed using unique offset addresses for the virtual paths, in order to place packets in, or transmit packets out of, the allocated address space. One dynamically allocated embodiment is described below with reference to FIGS. 9–15.

The network interface chip 100 includes a download DMA engine 108, which is coupled to the internal bus 105, and is responsive to the write data bits WrData[30:28] in a packet header, in this example to place a packet being downloaded into one of the first, second and third FIFO queues. The download DMA engine 108 provides virtual path write enable signals vp3We, vp2We, vp1We and virtual path write pointers vp3WrPtr[9:0], vp2WrPtr[9:0], vp1WrPtr[9:0] via line 109 to the first, second and third storage arrays 121, 122, 123, in support of the download operation.

The network interface chip 100 includes virtual path arbitration and control logic 110, and a timeout counter/register 111 supporting the second FIFO queue, and a timeout counter/register 112 supporting the third FIFO queue. The virtual path arbitration and control logic supplies signals muxSel1, muxSel2, muxSel3 on line 113 to the data multiplexer 106, in order to select data from one of the first, second and third storage arrays 121, 122, 123. Also the virtual path arbitration and control logic 110 supplies read pointers, vp1RdPtr[9:0], vp2RdPtr[9:0], vp3RdPtr[9:0], on line 118 to the first, second and third storage arrays 121, 122, 123. The virtual path arbitration and control logic 110 is responsive to valid bits vp1Valid, vp2Valid, vp3Valid supplied on line 114 from the respective FIFO queues in the transmit packet buffer 120 which indicate that a valid packet is present in the respective queues. Also, the virtual path arbitration and control logic 110 is responsive to the outputs vp2 Timeout, vp3 Timeout on lines 115 and 116, respectively, of the timers 111 and 112. The virtual path arbitration and control logic 110 also controls of the reset and loading of the timeout timers 111,112 via control signals vp3RdDone, vp2RdDone, vp2LdCnt, vp3LdCnt on line 117.

FIG. 3 shows the data structure for each virtual path in the transmit packet buffer 120. Thus, a FIFO queue includes contiguous storage space for a plurality packets in this example. A first packet in the FIFO queue has a frame start header 150 at a location pointed to by a read pointer 151 (RdPtr). The first packet has packet data 152, typically adjacent the frame start header 150. An end of packet pointer 153 (EopPtr) points to the address of the frame start header 154 of the next packet in the FIFO queue. The next frame includes packet data 156. A write pointer 155 (WrPtr) points to the next free address in the FIFO queue to which data is written as it is downloaded into the FIFO queue from the host.

FIG. 4 shows a format of the frame start header. The frame start header 160 includes 32-bits in this example. Bits 9:0 store the end of packet pointer vpEopPtr for the associated packet. Bits 27:10 are reserved. Bits 30:28 store a code vp1, vp2, vp3 indicating the virtual path to which the packet is to be assigned. Bit 31 stores the valid indication vpValid for the packet.

Bit 31 is set after a valid packet has been downloaded into the virtual path.

Accordingly, each virtual path in the TPB 120 stores downloaded packets in FIFO order. Each packet consists of Frame Start Header (FSH) followed by packet data. A WrPtr is used to point to the TPB location for the next data to be written into. A RdPtr points to the TPB location for the next data to be read out. A EopPtr is used to indicate where the packet ends.

Each packet has a Frame Start Header (FSH) in front of it, or otherwise associated with it, which is used to store the control information for the packet. Each time a packet is being downloaded, a FSH will be written with vpValid bit reset to indicate the packet is invalid (since it has not been completely downloaded yet), and carrying a code indicating the virtual path (quality of service level) to which the packet is assigned. After the FSH is written, packet data download will follow. Upon the completion of the packet data downloading, the final FSH will be written with vpValid bit set (indicate a valid packet) and the end of packet pointer (vpEopPtr) information will also be stored to indicate where the packet ends.

The download DMA engine 108 is used for packet download from host memory. The packet goes through the PCI Bus 101 to the Transmit Packet Buffer (TPB) 120. The TPB 120 consists of three virtual paths which can be used to handle three quality of service levels, for example, real time traffic, normal traffic and IPSec traffic. Based on the quality of service level set in Frame Start Header (FSH), the packet is downloaded into the corresponding virtual path. The code wrData[28] is used to indicate real time traffic. When this bit is set, vp1We will be asserted to push the packet into virtual path 1 TPB. The code wrData[29] is used as an indication of the normal traffic. If this bit is set, vp2We will be asserted to load the packet into virtual path 2 TPB. Finally, wrData[30] set will be used to handle IPSec traffic. The assertion of vp3We will be used to download an IPSec packet into virtual path 3 TPB. Packet download started with a FSH with an invalid packet indication followed by packet data write. At last, a final FSH will mark the downloaded packet to be valid with vpEopPtr stored to indicate where the packet ends.

Figure 5:
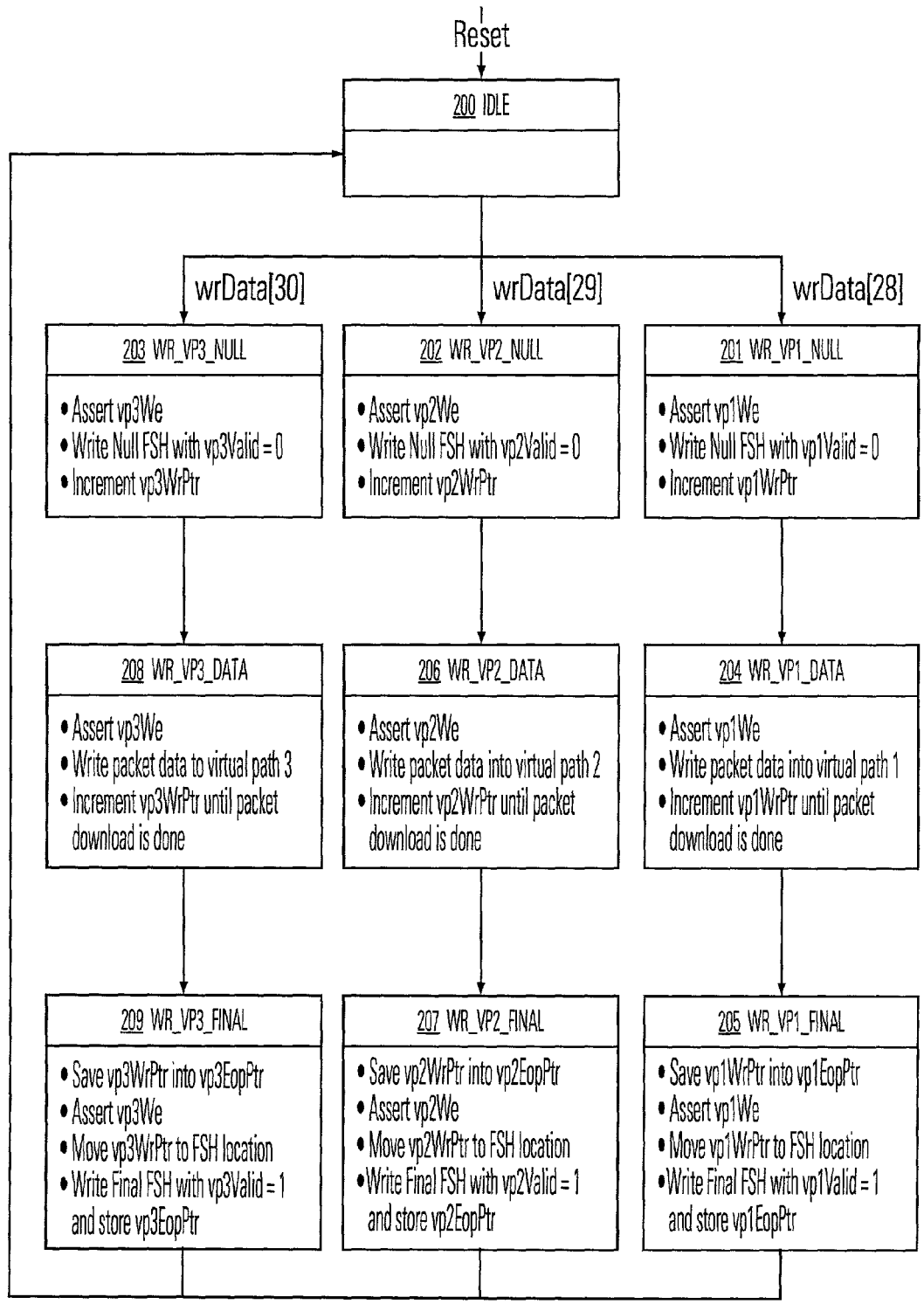
FIG. 5 is a flow diagram illustrating the functioning of the virtual path download state machine in the system of FIG. 2.

FIG. 5 illustrates the process executed by the download DMA engine 108, as a state machine. The state machine has an IDLE state 200, which is entered upon reset. In response to wrData[30:28], the state machine transitions to one of the WR_VP1_NULL state 201, WR_VP2_NULL state 201, and WR_VP3_NULL state 203. If wrData[28] is set, then it enters the WR_VP1_NULL state 201, in which the following actions occur:
   Assert vp1 We
   Write Null FSH with vp1Valid=0
   Increment vp1WrPtr
   Then the state machine transitions to the WR_VP1_DATA state 204, in which the following actions occur:
   Assert vp1We
   Write packet data into virtual path 1
   Increment vp1WrPtr until packet download is done
   Next the state machine transitions to the WR_VP1_FINAL state 205, in which the following actions occur:
   Save vp1WrPtr into vp1EopPtr
   *Assert vp1We
   Move vp1WrPtr to FSH location
   Write Final FSH with vp1Valid=1 and store vp1EopPtr
   Finally, the state machine returns to the IDLE state 200.
If wrData[29] is set, then it enters the WR_VP2_NULL state 202, in which the following actions occur:
   Assert vp2We
   Write Null FSH with vp2Valid=0
   Increment vp2WrPtr
   Then the state machine transitions to the WR_VP2_DATA state 206, in which the following actions occur:
   Assert vp2We
   Write packet data into virtual path 2
   Increment vp2WrPtr until packet download is done
   Next the state machine transitions to the WR_VP2_FINAL state 207, in which the following actions occur:
   Save vp2WrPtr into vp2EopPtr
   Assert vp2We
   Move vp2WrPtr to FSH location
   Write Final FSH with vp2Valid=1 and store vp2EopPtr
   Finally, the state machine returns to the IDLE state 200.

If wrData[30] is set, then it enters the WR_VP3_NULL state 203, in which the following actions occur:
   Assert vp3We
   Write Null FSH with vp3Valid=0
   Increment vp3WrPtr
   Then the state machine transitions to the WR_VP3_DATA state 208, in which the following actions occur:
   Assert vp3We
   Write packet data to virtual path 3
   Increment vp3WrPtr until packet download is done
   Next the state machine transitions to the WR_VP3_FINAL state 209, in which the following actions occur:
   Save vp3WrPtr into vp3EopPtr
   Assert vp3We
   Move vp3WrPtr to FSH location
   Write Final FSH with vp3Valid=1 and store vp3EopPtr
   Finally, the state machine returns to the IDLE state 200.

Virtual path arbitration and control logic 110 is used to arbitrate the packet transmission among different virtual paths. Each time a packet is downloaded into the virtual path buffer, the corresponding valid indication (vp1Valid, vp2Valid or vp3Valid) will be set in FSH bit 31. In one embodiment, virtual path 1 is used to handle real time traffic, and has the highest priority. Normal traffic priority will follow in virtual path 2, with IPSec traffic in virtual path has the lowest priority. A priority based arbitration scheme will be used to ensure that the respective virtual path read state is entered. Basically, the FSH will be read out first with eopPtr updated to indicate where the packet ends. Packet data read will follow until the read pointer reaches eopPtr. If no timeout occurs to indicate lower priority traffic needs attention, vp1RdDone, vp2RdDone or vp3RdDone signal will be asserted to indicate packet read out is done through the selected virtual path.

Figure 6:
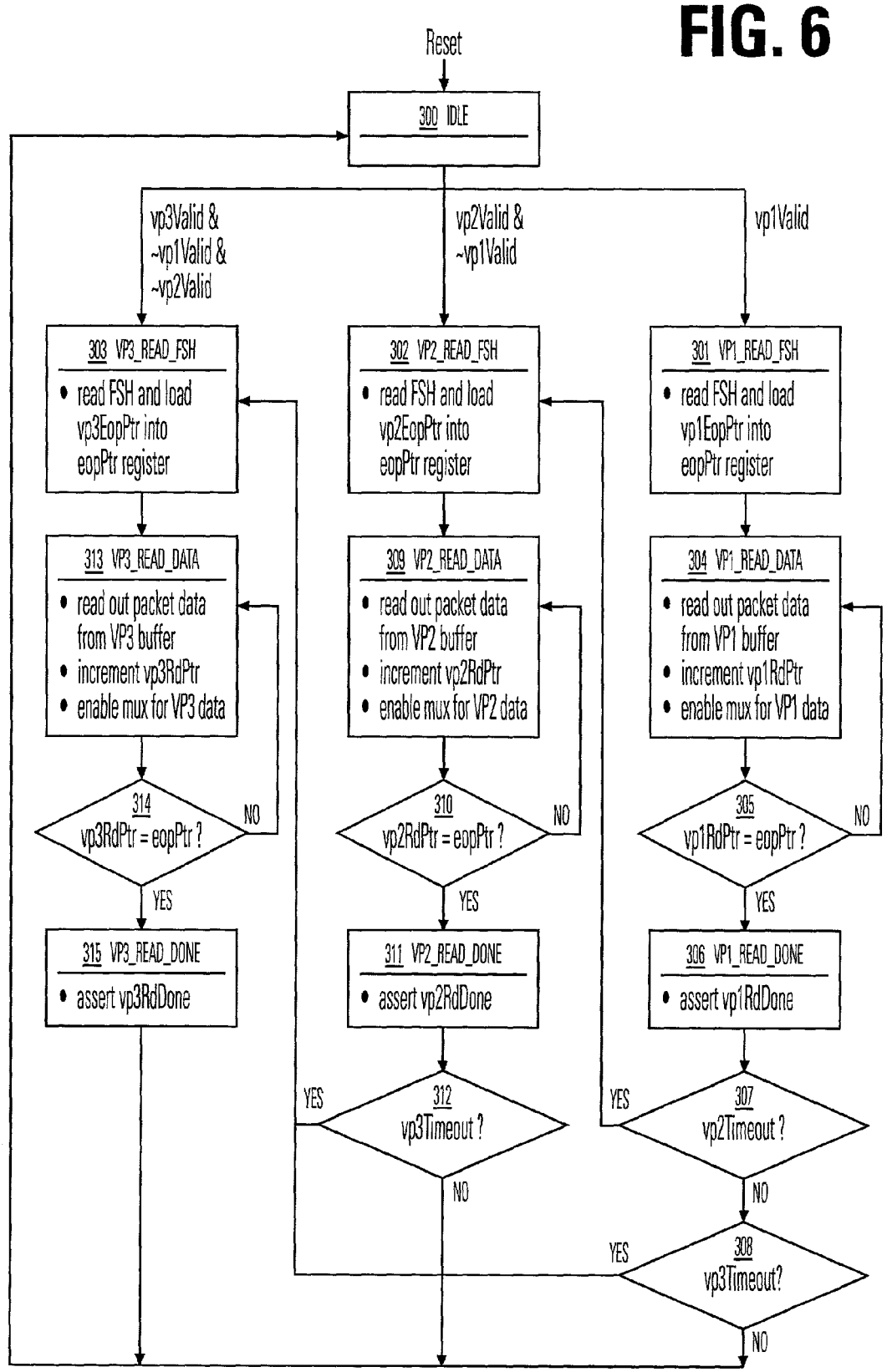
FIG. 6 is a flow diagram illustrating the functioning of the virtual path arbitration and control in the system of FIG. 1.

FIG. 6 illustrates the process executed by the virtual path arbitration and control logic 110, as a state machine. The state machine has an IDLE state 300, which is entered upon reset. If the signal vp1Valid is true, then it transitions to the VP1_READ_FSH state 301. If the signal vp2Valid is true and vp1Valid is not true, then it transitions to the VP2_READ_FSH state 302.

If the signal vp3Valid is true, and vp2Valid is not true and vp1Valid is not true, then it transitions to the VP3_READ_FSH state 303.

In the VP1_READ_FSH state 301, the following actions occur:
   read FSH and load vp1EopPtr into eopPtr register
   Then the state machine transitions to the VP1_READ_DATA state 304, in which the following actions occur:
   read out packet data from VP1 buffer
   increment vp1RdPtr
   enable mux for VP1 data
   After reading a data segment (e.g. 32 bit word) in the VP1_READ DATA state 304, the state machine determines whether the read pointer vp1RdPtr has reached the end of the packet as indicated by eopPtr (block 305). If not, the state machine stays in the VP1_READ_DATA state 304, for a next data segment. If the end of the packet has been reached, then the state machine transitions to the VP1 READ DONE state 306, in which the following actions occur:
   assert vp1RdDone
Before returning to the IDLE state 300, the state machine tests the timeout timer for the second virtual path (block 307). If it has timed out, then the state machine transitions to the VP2_RD_FSH state 302. If it has not expired, then the state machine tests the timeout timer for the third virtual path (block 308). If it has timed out, then the state machine transitions to the VP3_RD_FSH state 303. If it has not expired, then the state machine returns to the IDLE state 300.

In the VP2_READ_FSH state 302, the following actions occur:
    read FSH and load vp2EopPtr into eopPtr register
    Then the state machine transitions to the VP2_READ_DATA state 309, in which the following actions occur:
    read out packet data from VP2 buffer
    increment vp2RdPtr
    enable mux for VP2 data After reading a data segment (e.g. 32 bit word) in the VP2_READ_DATA state 309, the state machine determines whether the read pointer vp2RdPtr has reached the end of the packet as indicated by eopPtr (block 310). If not, the state machine stays in the VP2_READ_DATA state 309, for a next data segment. If the end of the packet has been reached at block 310, then the state machine transitions to the VP2_READ_DONE state 311, in which the following actions occur:
    assert vp2RdDone Before returning to the IDLE state 300, the state machine tests the timeout timer for the third virtual path (block 312). If it has timed out, then the state machine transitions to the VP3_RD_FSH state 303. If it has not expired, then the state machine returns to the IDLE state 300.

In the VP3_READ_FSH state 303, the following actions occur:
    read FSH and load vp3EopPtr into eopPtr register
    Then the state machine transitions to the VP3_READ_DATA state 313, in which the following actions occur:
    read out packet data from VP3 buffer
    increment vp3RdPtr
    enable mux for VP3 data After reading a data segment (e.g. 32 bit word) in the VP3_READ_DATA state 313, the state machine determines whether the read pointer vp3RdPtr has reached the end of the packet as indicated by eopPtr (block 314). If not, the state machine stays in the VP3_READ_DATA state 313, for a next data segment. If the end of the packet has been reached at block 314, then the state machine transitions to the VP3_READ_DONE state 315, in which the following actions occur:
    assert vp3RdDone Then, the state machine transitions to the IDLE state 300.

Figure 7:
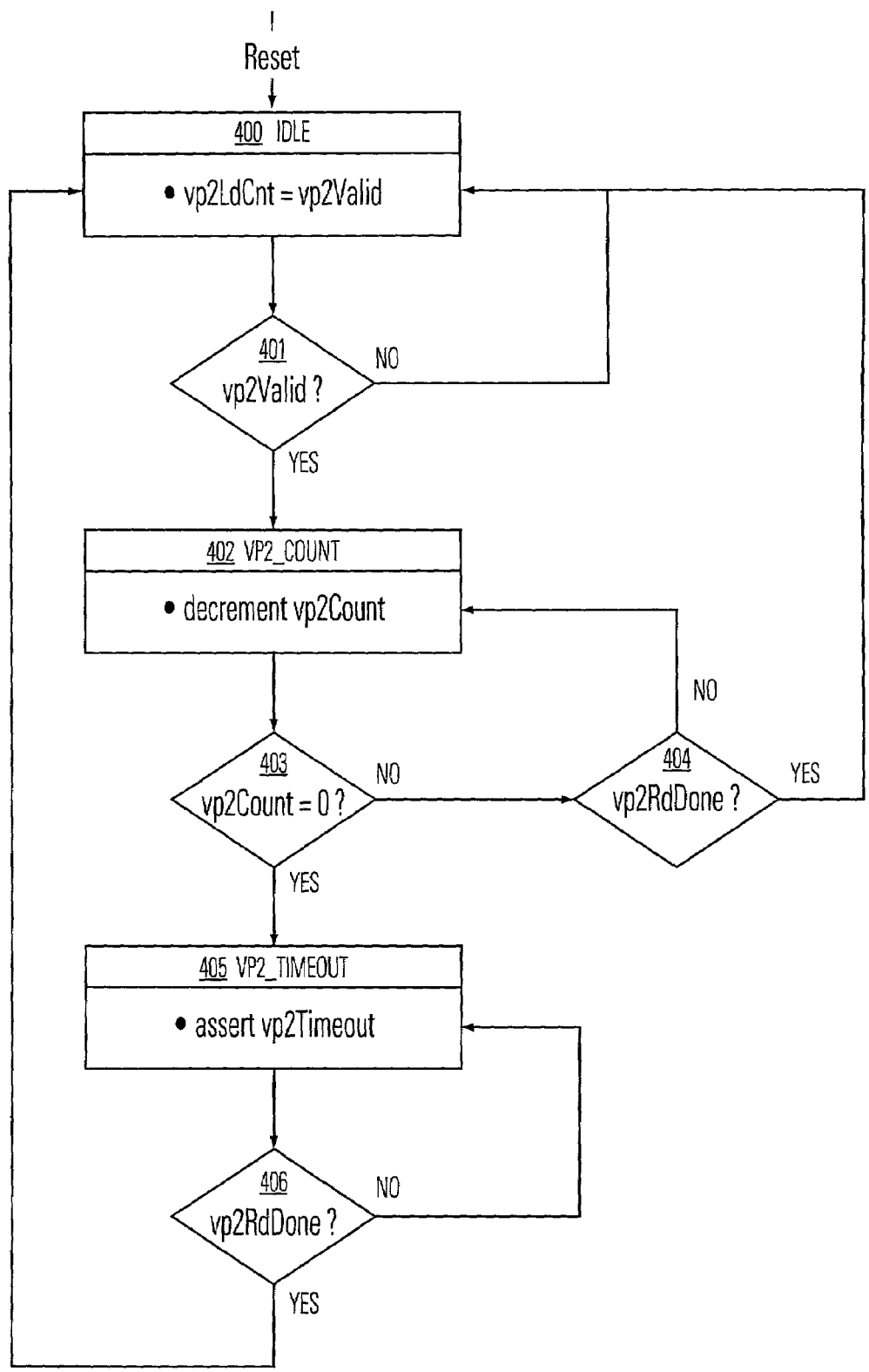
FIG. 7 is a flow diagram illustrating the functioning of the timeout counter for control of virtual path 2 in the system of FIG. 1.
Figure 8:
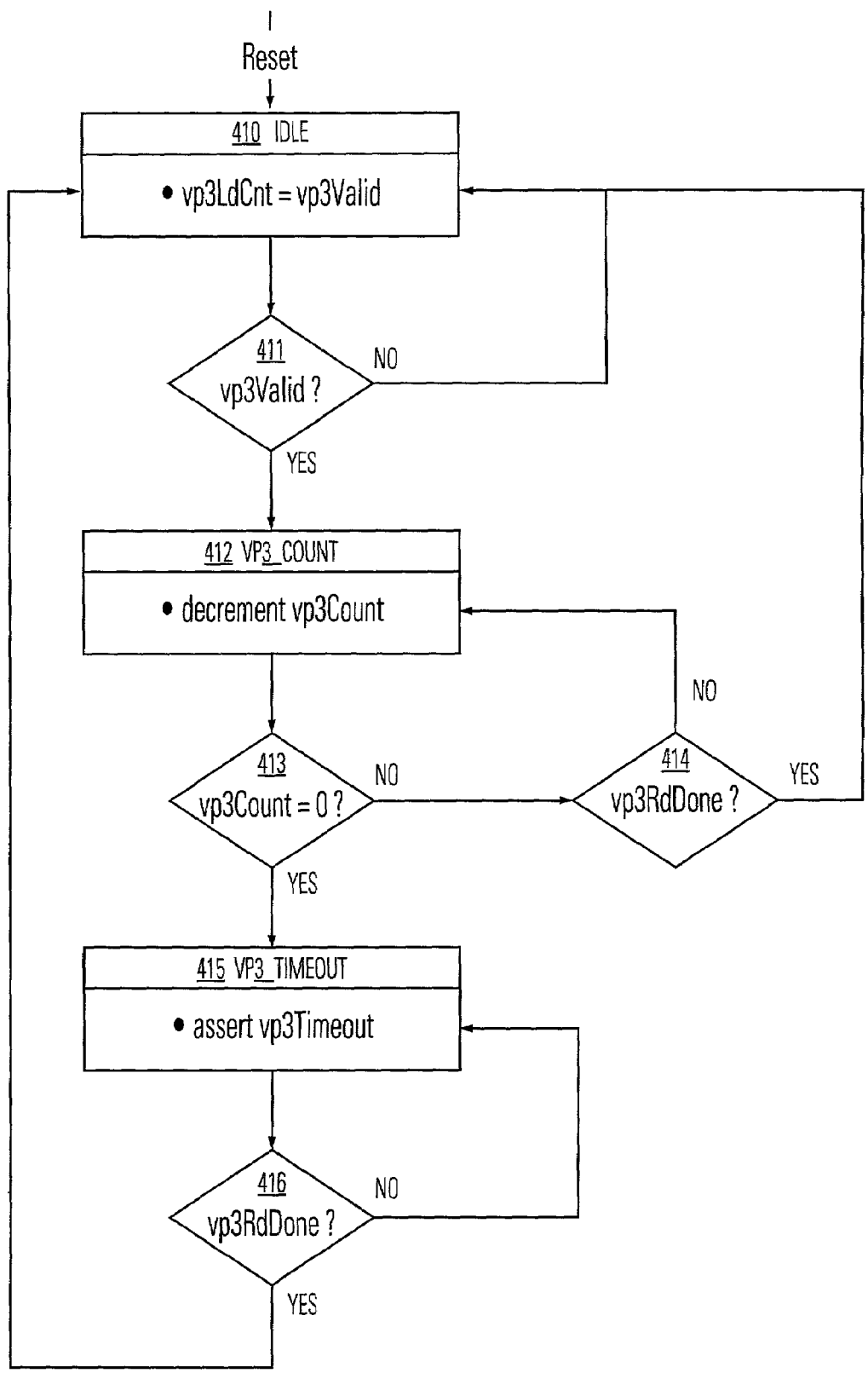
FIG. 8 is a flow diagram illustrating the functioning of the timeout counter for control of virtual path 3 in the system of FIG. 1.

FIGS. 7 and 8 illustrate the operation of the timeout counter/registers 111 and 112, respectively. In order to ensure no starvation and guarantee forward progress, each time a packet is read out of virtual path 1, vp2 Timeout will be checked. If a timeout has occurred, and virtual path 1 still has packets remaining to be read out, it will be preempted to in favor of virtual path 2 traffic. If there is no virtual path 2 timeout, vp3 Timeout will be checked. The assertion of this signal will cause virtual path 3 traffic to be handled accordingly. The same scheme is used to preempt virtual path 2 traffic and guarantee no starvation on virtual path 3.

In order to prevent starvation and guarantee forward progress, a preemption scheme is used to preempt higher priority virtual path traffic flow if lower priority virtual paths traffic are not serviced in time. This scheme will ensure that the higher priority traffic will be handled with minimum latency without stalling the lower priority traffic. Since virtual path 1 has the highest priority, no timeout counter for this virtual path will be needed. For handling virtual path 2 or virtual path 3 traffic flow, the corresponding virtual path timeout counter will be loaded and start counting down if there is any packet in its virtual path buffer (indicated by vp2Valid or vp3Valid). If the packet is transmitted out from the associated virtual path buffer before its timer counts down to zero, the counter will be reloaded to its initial value and above sequence will repeat. Otherwise, it indicates that the packet in the virtual path 2 buffer or the virtual path 3 buffer cannot be transmitted out in time. The vp2 Timeout or vp3 Timeout signals will be asserted to notify the virtual path arbitration and control logic 110 that preemption of higher priority traffic is needed to service lower priority traffic.

FIG. 7 illustrates the operation of the VP2 timeout counter/register, as a state machine. The state machine has an IDLE state 400 in which the following act occurs:
    vp2LdCnt vp2Valid Next the valid bit for the second virtual path is checked (block 401). If vp2Valid is not set, the machine stays in the IDLE state 400. If vp2Valid is set, the machine transitions to the VP2_COUNT state 402, in which the following act occurs:
    decrement vp2Count The state machine then checks to see if the timeout has occured (block 403). If the vp2Count=0? test is false, then the state machine checks to see if a read has completed from the second virtual path (block 404). If the vpRdDone? test is false, then the machine returns to the VP2_COUNT state 402. If the vpRdDone? test is true, then the machine returns to the IDLE state 400. If in block 403 the vp2Count=0? test is true, then the machine transitions to the VP2_TIMEOUT state 405, in which the following act occurs:
    assert vp2 Timeout Then the state machine checks to see if a read has completed from the second virtual path (block 406). If the vp2RdDone? test is false, then the machine returns to the VP2_TIMEOUT state 405. If the vp2RdDone? test in block 406 is true, then the machine returns to the IDLE state 400.

FIG. 8 illustrates the operation of the VP3 timeout counter/register, as a state machine. The state machine has an IDLE state 410 in which the following act occurs:
    vp3LdCnt=vp3Valid Next the valid bit for the third virtual path is checked (block 411). If vp3Valid is not set, the machine stays in the IDLE state 410. If vp3Valid is set, the machine transitions to the VP3_COUNT state 412, in which the following act occurs:
    decrement vp3 Count The state machine then checks to see if the timeout has occured (block 413). If the vp3Count=0? test is false, then the state machine checks to see if a read has completed from the third virtual path (block 414). If the vpRdDone? test is false, then the machine returns to the VP3_COUNT state 412. If the vp3RdDone? test is true, then the machine returns to the IDLE state 410. If in block 413 the vp3Count=0? test is true, then the machine transitions to the VP3_TIMEOUT state 415, in which the following act occurs:
    assert vp3 Timeout Then the state machine checks to see if a read has completed from the third virtual path (block 416). If the vp3RdDone? test is false, then the machine returns to the VP3_TIMEOUT state 415. If the vp3RdDone? test in block 406 is true, then the machine returns 2@ to the IDLE state 410.

In the embodiments described above, each storage array 121, 122, 123 has a fixed size. This could cause the buffer to be under-utilized or to be over-utilized for each virtual path. Over-utilized memory buffers may cause TPB overrun which may block incoming traffic. Under-utilized memory buffers may waste resources. As shown if FIG. 9, in order to optimize memory usage, a single memory array can be used as the transmit packet buffer TPB 520, to accommodate all the virtual path FIFO queues. Each virtual path FIFO queue is allocated dynamically based on traffic flow on each virtual path.

In one embodiment, each virtual path will have an associated free buffer list. The free buffer list stores free buffer descriptors corresponding to its virtual path. Each free buffer descriptor is used to indicate the free buffer location allocated to that particular virtual path. The downloaded packet can be stored into non-contiguous memory locations following the free buffer list of the corresponding virtual path.

Figure 9:
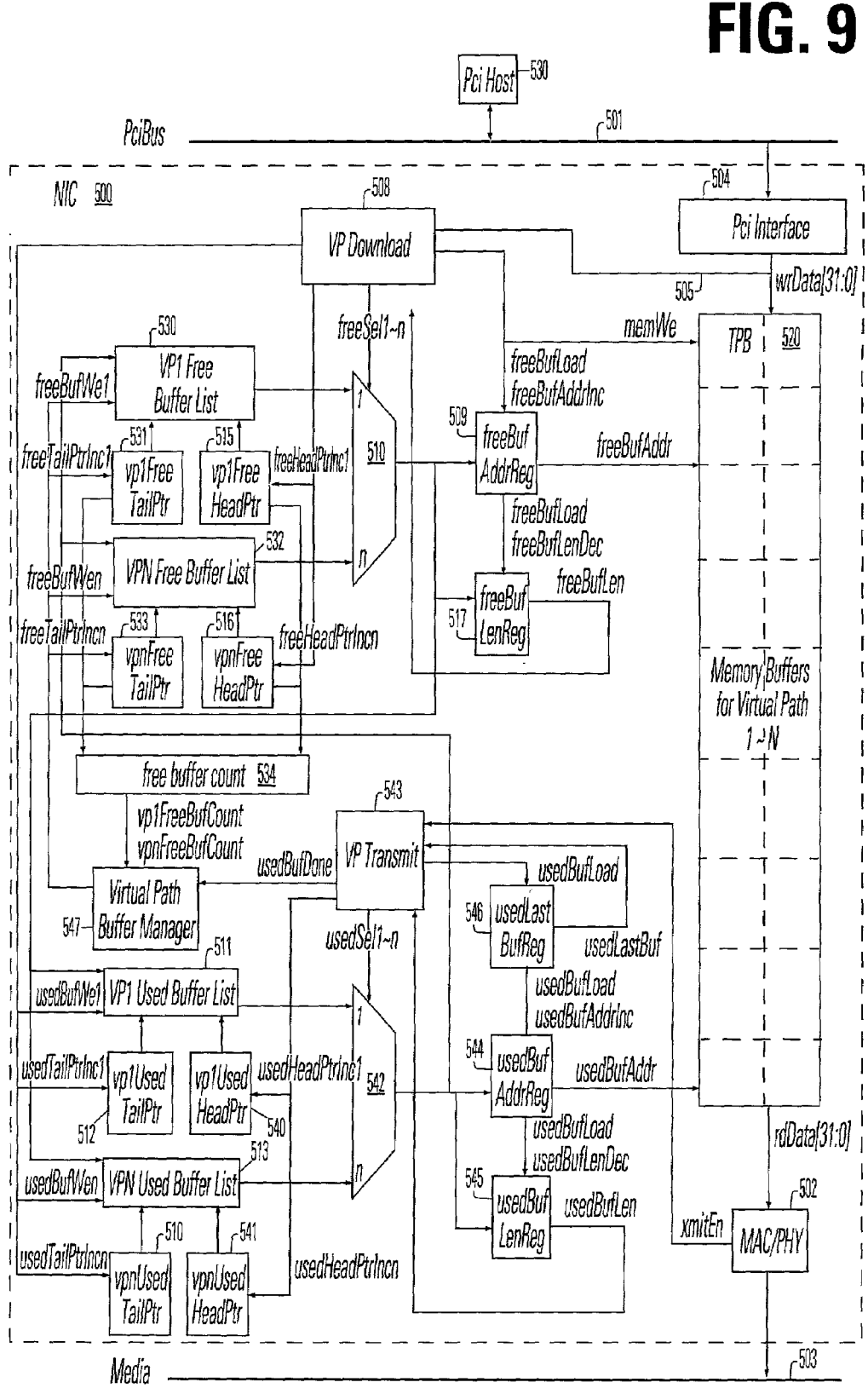
FIG. 9 provides a simplified block diagram of an integrated circuit supporting dynamically allocated virtual paths according to the present invention.

FIG. 9 provides a conceptual diagram of a system implementing the invention, including a host CPU 530 coupled to a PCI bus 501 and an integrated circuit 500 (such as ASIC 14 in FIG. 1) including the logical circuitry for transferring data packets into and out from a TPB 520 according to the present invention. The system includes a medium access control and physical layer circuit MAC/PHY block 502, which is coupled to the network medium 503. For simplicity, only parts of the circuit that relate to the host-to-LAN transfer (data transmit) direction are shown.

In this example, the host bus 501 is implemented as a PCI bus. The integrated circuit 500 includes a PCI interface block 504 between the bus 501, and an internal data bus 505. The internal data bus 505 is coupled to the transmit packet buffer 520. The transmit packet buffer 520 includes a single storage array, used for first, second and third FIFO queues. The first, second and third FIFO queues are used for respective virtual paths between the host PCI bus 501, and the network port served by the MAC/PHY block 502.

A virtual path download engine 508 is coupled to the internal bus 505, and operates substantially as described above with respect to the system of FIG. 2. However, rather than managing three separate storage arrays, the output of the virtual path download engine 508 is coupled to a free buffer address register 509 and to a free buffer length register 517 by signals freeBufLoad, freeBufAddrInc and freeBufLenDec, a multiplexer 510 by the signal freeSell-n, and to the logic used for managing the free buffer list for the virtual paths, including blocks 515 and 516 by signals freeHeadPtrInc 1 and freeHeadPtrIncn, and for managing the used buffer list for the virtual paths, including blocks 511, 512, 513 and 514 by signals usedTailPtrInc1 and usedTailPtrIncn. Inputs to the virtual path download engine 508 include the output freeBufLen from a free buffer length register 517 and the data wrData[31:0] on the internal bus 505.

For each virtual path VP1 to VPn, managed by the logic, the circuit includes a free buffer list and a used buffer list. Logic supporting the virtual path VP1 includes VP1 free buffer list 530, VP1 free buffer tail pointer 531, and VP1 free buffer head pointer 515. Logic supporting the virtual path VPn includes the VPn free buffer list 532, VPn free buffer tail pointer 533, and VPn free buffer head pointer 516. The free tail pointer and free head pointer blocks 531, 515, 532, 516 are coupled to a free buffer count block 534. The free buffer count block 534 supplies the signals vp1FreeBufCount and vpnFreeBufCount to the virtual path buffer manager 547. The multiplexer 510 is responsive to the freeSell-n signal from the virtual path download engine 508 to determine which free buffer list to use in connection with the current packet. The output of the multiplexer 510 is applied to the free buffer address register 509, and the free buffer length register 517. In addition, the output of the multiplexer 510 is applied to the used buffer list blocks 511 and 513.

The logic supporting VP1 includes VP1 used buffer list 511, VP1 used tail pointer 512, and VP1 used head pointer 540. Logic supporting the virtual path VPn includes the VPn used buffer list 513, the VPn used tail pointer 514, and VPn used head pointer 541. A multiplexer 542 is controlled by a signal usedSel1-n provided by a virtual path transmit engine 543 to select which of the used buffer lists 511, 513 to use for updating a used buffer address register 544 and a used buffer length register 545. The output multiplexer 542 is also coupled to the free buffer list blocks 530 and 532. The used buffer logic also includes a used last buffer register 546 which is coupled to the virtual path transmit engine 543. The virtual path transmit engine 543 supplies the usedBufLoad, usedBufAddrInc and usedBufAddrDec signals to the used last buffer register 546, the used buffer register 544 and the used buffer length register 545. The used last buffer register 546 returns the usedLastBuf signal to the virtual path transmit engine 543. The virtual path transmit engine 543 supplies the usedBufDone signal to the virtual path buffer manager 547. Also, the virtual path transmit engine 543 supplies the usedHeadPtrInc1 and usedHeadPtrIncn signals to the used buffer head pointer register 540 for virtual path 1, and the used buffer head pointer register 541 for virtual path n. The virtual path transmit engine 543 is response to a transmit enable signal xmitEn from the MAC/PHY block 502 to begin a transmit 2 process, by which the data rdData[31:0] from the transmit packet buffer 520 is supplied for transmission on the network. The virtual path buffer manager 547 is used for managing the cooperation of the used buffer list and the free buffer list.

The virtual path transmit engine 543 operates according to a priority process substantially as described above with respect to the system of FIG. 2, except that it cooperates with the dynamic allocation of buffers in the transmit packet buffer 520. The used buffer address register 544 is used for generation of the read pointer during the transmit process of a packet from a virtual path. Likewise, the free buffer address register 509 is used for generation of a write pointer during a download of a packet from the host.

Figure 10:
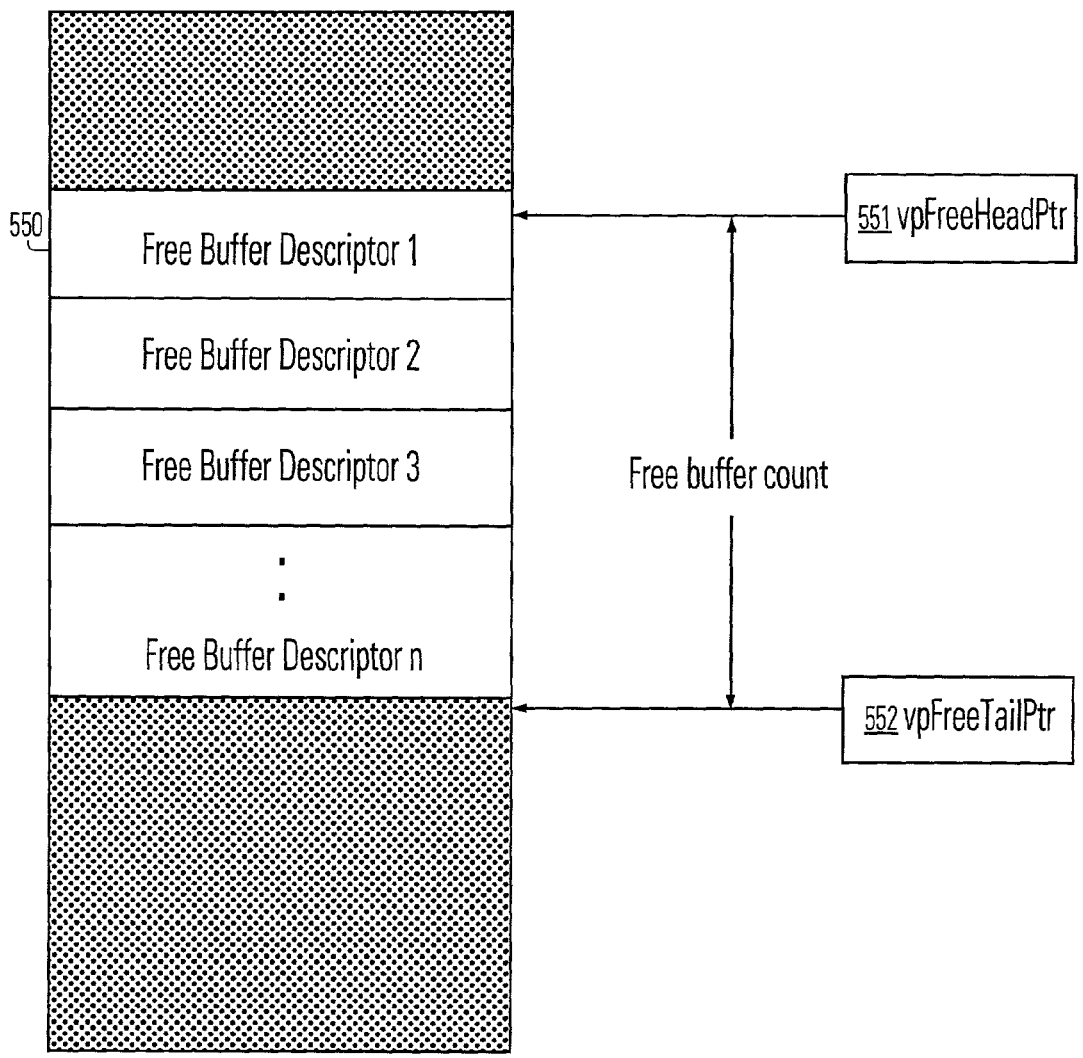
FIG. 10 illustrates data structures used in the free buffer list for the transmit packet buffer (TPB) with dynamically allocated virtual paths in the system of FIG. 9.

FIG. 10 illustrates the format of a virtual path free buffer list data structure 550, one of which is associated with each of the virtual paths. The free buffer list data structure 550 stores a plurality of free buffer descriptors (1 . . . n). A vpFreeHeadPtr 551 points to the beginning of the free buffer list and a vpFreeTailPtr 552 points to the end of the free buffer list. Each time a free buffer is allocated to the corresponding virtual path, vpFreeTailPtr 552 will be incremented by one, to point to the next entry of free buffer list. Whenever a free buffer is consumed to store the downloaded packet, vpFreeHeadPtr 551 will be incremented by one to point to the next available free buffer. The difference between the pointers "vpFreeTailPtr–vpFreeHeadPtr" can be used to derive the free buffer count. Whenever a used buffer is available, the virtual path buffer manager 547 will release this buffer to the virtual path free buffer list of a virtual path having the least amount of free buffers available.

Figures 11, 12:
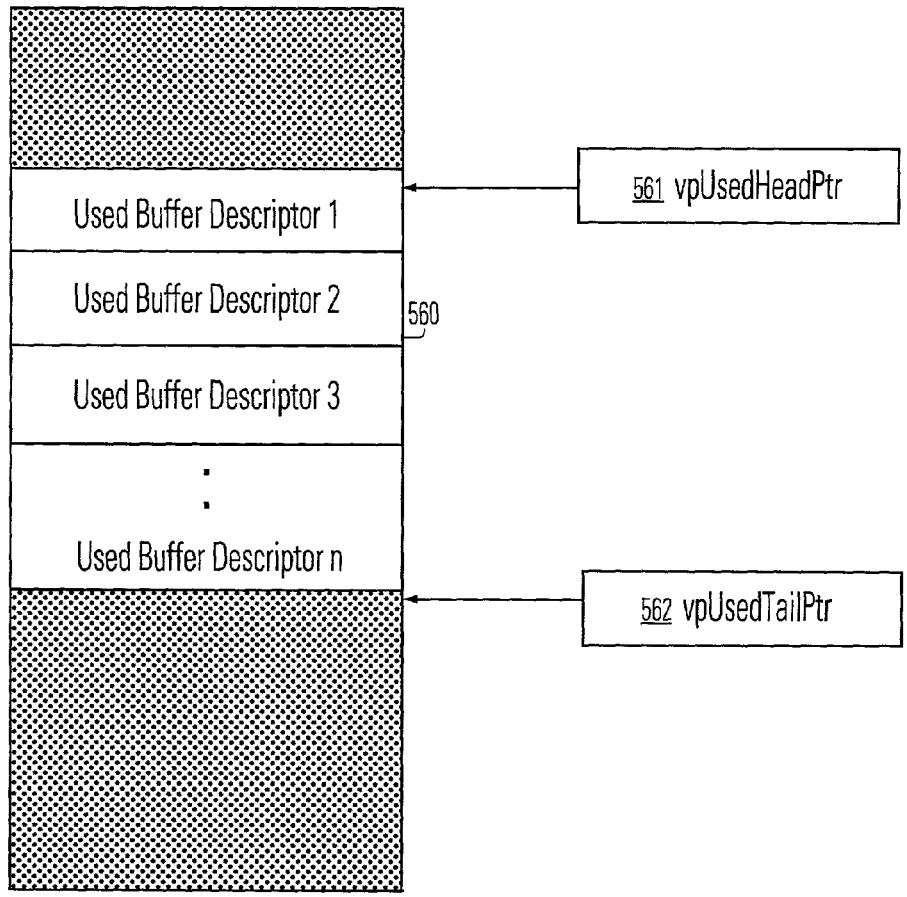
FIG. 11 illustrates data structures used in the used buffer list for the transmit packet buffer (TPB) with dynamically allocated virtual paths in the system of FIG. 9.
FIG. 12 illustrates a buffer descriptor format used in the FIFO based transmit packet buffer (TPB) with virtual paths in the system of FIG. 9.

After a free buffer is used to store the downloaded packet, this buffer becomes a used buffer. The free buffer descriptor will become a used buffer descriptor and gets pushed into used buffer list for the corresponding virtual path. FIG. 11 illustrates the format of a virtual path used buffer list data structure 560, one of which is associated with each of the virtual paths. The used buffer list data structure 560 stores a plurality of used buffer descriptors (1 . . . n). A vpUsedHeadPtr 561 points to the beginning of the used buffer list and a vpUsedTailPtr 562 points to the end of the used buffer list. Each time a free buffer becomes in use, its free buffer descriptor will be appended into the tail of the used buffer list 560 and the vpUsedTailPtr 562 will be incremented by one. After the virtual path for a current packet is identified according to the priority scheme, the packet transmit engine 543 will follow the used buffer list of this virtual path for packet transmission. As soon as all the packet data within this used buffer are transmitted out, vpUsedHeadPtr 561 will be incremented by one. The next used buffer descriptor will be fetched and packet data transmission for the subsequent used buffer will continue. This sequence will repeat until all the packet data are transmitted out of the used buffers.

FIG. 12 shows the format of a used buffer descriptor 570. Each buffer descriptor 570 consists of buffer length in bits [6:0], buffer address in bits [22:7] and lastBuf indication in bit [31]. In this example, with a seven bit buffer length field, each buffer can be initialized up to 128 bytes in size. The buffer size can be selected to meet the needs of a particular implementation. The greater the buffer length is, the less buffer descriptors will be needed to support all the buffers within a virtual path. The potential drawback for larger buffer size is more space could be wasted within a buffer. This is true especially for smaller packets since each one may only occupy one buffer, without being aligned at a buffer boundary. If a packet consists of multiple buffers, the buffer length field for each buffer will be the maximum value except the last one, which could be less if the packet is not ended at buffer boundary. The buffer length field for the last buffer will be rewritten upon completion of the packet download operation to indicate where the packet ends. Buffer address is used to indicate the memory address for this buffer in the storage array used for the transmit packet buffer 520. This address can be used either to store the downloaded packet, or to read out the stored packet to be transmitted. Only the buffer address is needed for locating each buffer since the low-order bits can all be set to zeros pointing to the beginning of each buffer. A lastBuf bit is used to indicate the last buffer within a packet. This bit will be set in the last free buffer used to store the downloaded packet. While reading a packet out for transmission, a used buffer descriptor will be fetched and this bit will be set on the last used buffer, and is used by packet transmit engine 543 to determine where the packet ends.

A packet download from host memory goes through the Pci Bus 501 to the Transmit Packet Buffer 520. TPB can be configured to support multiple virtual paths which can be used to handle various traffic classes such as real time traffic, normal traffic and IPSec traffic. Based on the service level set in Frame Start Header (FSH), the packet can be downloaded into the corresponding virtual path. This embodiment provides the flexibility to support 1~n virtual paths in a single TPB array. Each virtual path has an associated free buffer list which stores all the available free buffers corresponding to this virtual path which can be used by virtual path download engine to transfer the packet data into these buffers. After the specific virtual path is identified to store the downloaded packet, a free buffer list fetch operation for this virtual path will be initiated. The download engine will fetch the first available free buffer descriptor which is pointed by freeHeadPtr. Free buffer address and free buffer length information will be stored into freeBufAddrReg and freeBufLenReg. Each time a packet data is downloaded into the TPB, freeBufAddrReg will be incremented by one and freeBufLenReg will be decremented by one. Above process will repeat until freeBufLen reaches zero, which indicates the current free buffer has been consumed to store the downloaded packet. This buffer descriptor will be moved to the used buffer list (by asserting usedBufWe and usedTailPtrInc). A freeHdPtrInc will also be incremented which will be used to remove this buffer descriptor from free buffer list. If the packet hasn't been completely downloaded into the specific virtual path TPB, the next free buffer descriptor will be fetched from free buffer list. The same sequence will repeat to move the packet data into TPB. Since a downloaded packet may not be aligned at buffer boundary, it is possible that the packet downloading may finish before freeBufLenReg is decremented to zero. In this case, before moving this buffer descriptor into the used buffer list, buffer length field needs to be updated to indicate where the packet ends. A lastBuf bit will also need to be set to indicate the last buffer is being used for the downloaded packet.

Figure 13:
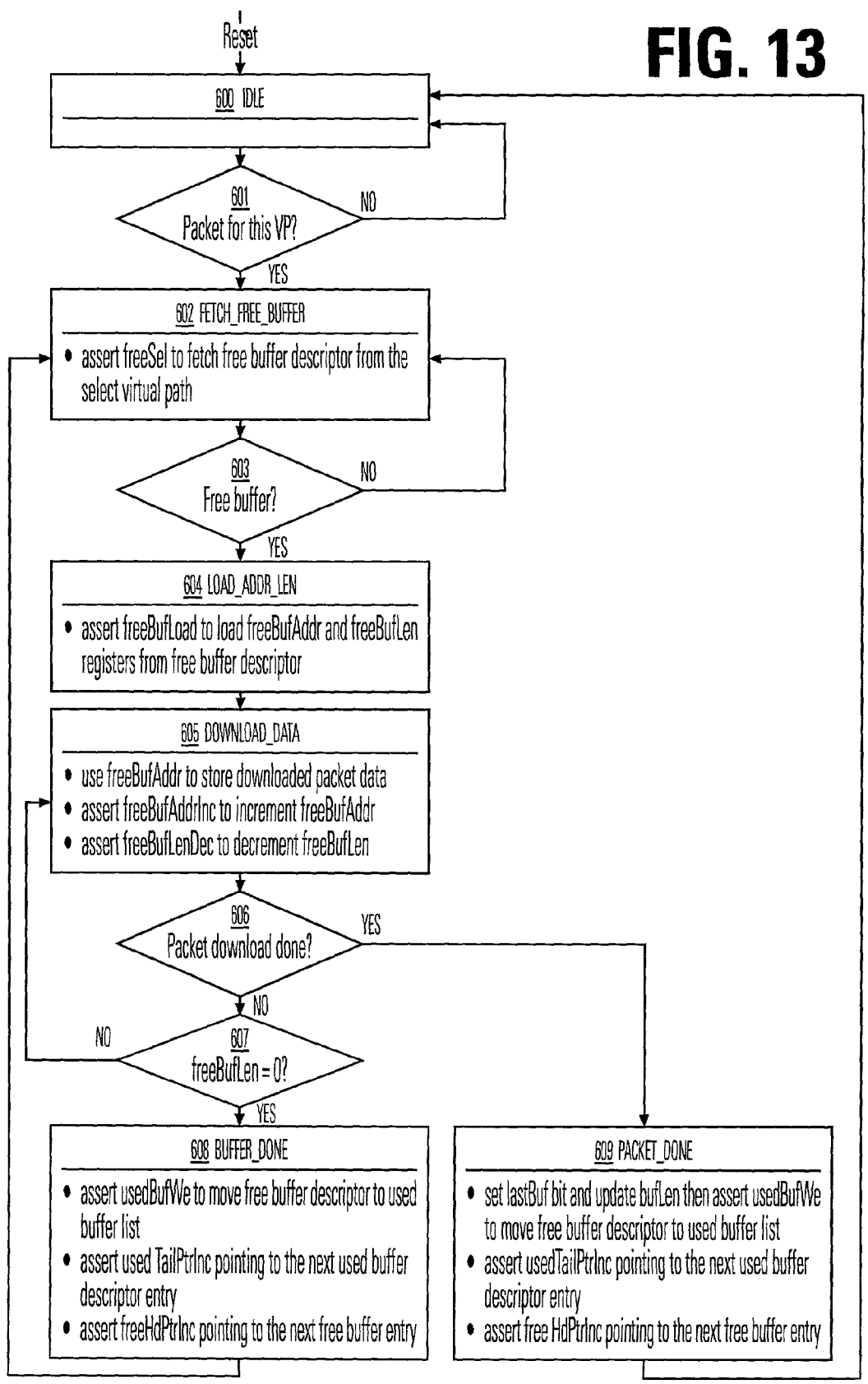
FIG. 13 is a flow diagram illustrating the functioning of the virtual path download state machine with dynamic buffer allocation as in the system of FIG. 9.

FIG. 13 illustrates the operation of the virtual path download logic 508 for a particular virtual path, as a state machine. The state machine has an IDLE state 600. When in the IDLE state 600, the process looks for a packet designated for the particular virtual path (block 601). If the packet is for this virtual path, then the machine transitions to the FETCH_FREE_BUFFER state 602, in which the following act occurs:

assert freeSe1 to fetch free buffer descriptor from the selected virtual path

Then the machine waits until a free buffer is available (block 603). When a free buffer is available, the machine transitions to the LOAD_ADDR_LEN state 604, in which the following acts occur:

assert freeBufLoad to load freeBufAddr and freeBufLen registers from free buffer descriptor Then the machine transitions to the DOWNLOAD_DATA state 605, in which the following actions occur:

use freeBufAddr to store downloaded packet data assert freeBufAddrInc to increment freeBufAddr assert freeBufLenDec to decrement freeBufLen The machine then tests whether the packet download is complete (block 606). If it is not complete, then the machine tests whether the free buffer length register 517 is equal to zero 2 (block 607). If the free buffer length register 517 is not equal to zero, then the machine returns to state 605 to download another data segment. If the free buffer length register 517 is equal to zero at block 607, then the machine transitions to the BUFFER_DONE state 608, in which the following actions occur:

assert usedBufWe to move free buffer descriptor to used buffer list assert usedTailPtrInc pointing to the next used buffer descriptor entry assert freeHdPtrInc pointing to the next free buffer entry Then the machine transitions back to the FETCH_FREE_BUFFER state 602, where it continues to download data into a next free buffer. If at block 606, it is determined that the packet download is complete, then the machine enters the PACKET_DONE state 609, where the following actions occur:

set lastBuf bit and update bufLen then assert usedBufWe to move free buffer descriptor to used buffer list assert usedTailPtrInc pointing to the next used buffer descriptor entry assert freeHdPtrInc pointing to the next free buffer entry Then the download machine transitions to the IDLE state 600.

Figure 14:
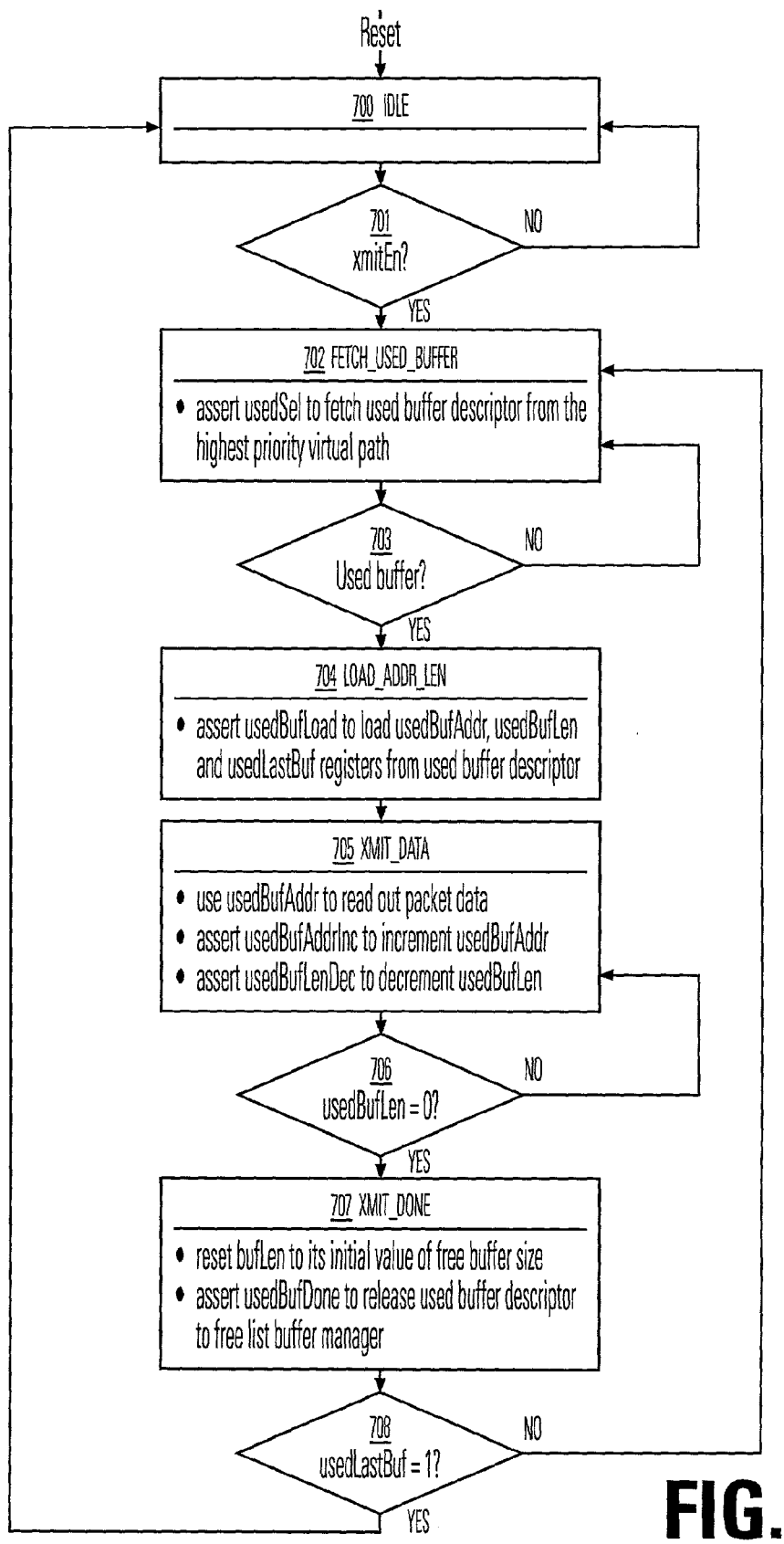
FIG. 14 is a flow diagram illustrating the functioning of the virtual path transmit state machine with dynamic buffer allocation as in the system of FIG. 9.

The virtual path transmit logic 543 is illustrated in FIG. 14 as a state machine. There are up to n used buffer lists and each used buffer list stores the downloaded packets for the corresponding virtual path. If the transmitter is enabled inside of the MAC 502, packets in each virtual path will be transmitted out of used buffers based on each virtual path's priority assignment, as described above. In order to prevent starvation and guarantee forward progress, each lower priority virtual path will have a timeout counter and a higher priority virtual path traffic will be preempted to service the lower priority virtual path upon detecting timeout. In order to transmit the downloaded packet from the virtual path, usedSe1 will be asserted to cause the multiplexer 542 to select the used buffer list. The used buffer descriptor pointed by usedHeadPtr will be fetched first. The used buffer address and length information in conjunction with the used last buffer indication will be loaded into usedBufAddrReg, usedBuffenReg and usedLastBufReg, respectively. The packet transmit engine 543 will follow this information to read out the packet data from the used buffer and transmit them out through the MAC/PHY 502 to the network medium. Each time a packet data segment is read out, usedBufAddrReg will be incremented by one and usedBufLenReg will be decremented by one, to point to the next memory location within the used buffer. This operation will repeat itself until usedBufLenReg is decremented to zero. At this time, all the data in used buffer have been read out completely. The used buffer length field in the used buffer descriptor will be reset to its initial value of the free buffer size. A usedBufDone signal will be asserted to notify virtual path buffer manager that the used buffer should be released to free buffer list of the virtual path which has the least free buffers available. A usedHeadPtr will be incremented by one point to the next used buffer descriptor entry. If usedLastBit is set, the packet has been transmitted out completely. Packet transmit engine 543 services the next downloaded packet from the virtual path which has the highest priority. Otherwise, the next used buffer descriptor in used buffer list will be fetched and packet transmit operation will continue until all the used buffer descriptors for the same packet are fetched and all the packet data are transmitted from these used buffers.

As shown in FIG. 14, the machine has an IDLE state 700, which is entered on reset. In the IDLE state 700, the machine waits for a transmit enable signal (block 701). When the transmit enable signal is asserted, the machine transitions to the FETCH_USED_BUFFER state 702, in which the following actions occur:

assert usedSe1 to fetch used buffer descriptor from the highest priority virtual path In the FETCH_USED_BUFFER state 702, the machine waits for an available used buffer (block 703). When a used buffer is available, the machine transitions to the LOAD_ADDR_LEN state 704, in which the following actions occur:

assert usedBufLoad to load usedBufAddr, usedBufLen and usedLastBuf registers from used buffer descriptor Then the machine transitions to the XMIT_DATA state 705, in which the following actions occur:

use usedBufAddr to read out packet data assert usedBufAddrInc to increment usedBufAddr assert usedBufLenDec to decrement usedBufLen The machine then tests whether the used buffer length register has decremented to zero (block 706). If it has not, then it returns to the XMIT_DATA state 705. If the used buffer length register has decremented to zero in the block 706, then the machine transitions to the XMIT_DONE state 707, in which the following actions occur:

reset bufLen to its initial value of free buffer size assert usedBufDone to release used buffer descriptor to free list buffer manager The machine then tests whether the used last buffer signal has been asserted (block 708). If it has not, then the machine returns to the FETCH_USED_BUFFER state 702, to continue transmission. If at block 708, the used last buffer signal has been asserted, then the machine returns to the IDLE state 700.

After the packet data are transmitted out of an used buffer, an usedBufDone signal will be generated by packet transmit engine. This signal is used to notify virtual path buffer manager 547, that the used buffer descriptor should be released to free buffer list. The virtual path buffer manager 547 will check the virtual path with the fewest free buffer descriptors available (computed through freeTailPtr–freeHeadPtr for each virtual path). A freeBufWe signal will be asserted to write the released used buffer descriptor to the tail of the selected free buffer list and the freeTailPtr will be incremented by one.

Figure 15:
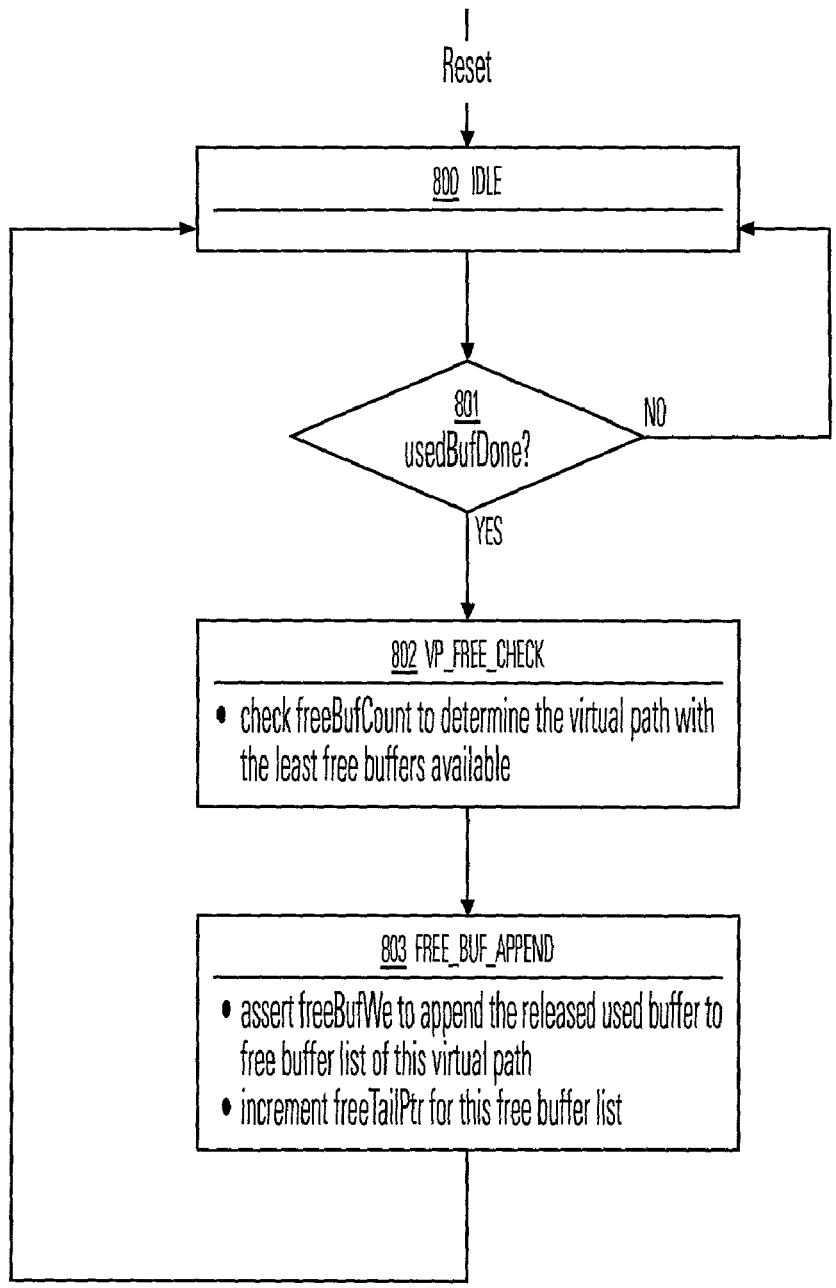
FIG. 15 is a flow diagram illustrating the functioning of buffer manager state machine supporting the dynamic buffer allocation in the system of FIG. 9.

FIG. 15 shows the operation of the virtual path buffer manager 547 as a state machine. The state machine has an IDLE state 800, which is entered on reset, in which the machine waits for the used buffer done signal (block 801). When the used buffer done signal is asserted, the machine transitions to the VP_FREE_CHECK state 802, in which the following actions occur:

check freeBufCount to determine the virtual path with the least free buffers available Then the machine transitions to the FREE_BUF_APPEND state 803, in which the following actions occur:

assert freeBufWe to append the released used buffer to free buffer list of this virtual path increment freeTailPtr for this free buffer list Then the process returns to the IDLE state 800.

The present invention provides a number of unique features, including:

Allows various traffic to use different virtual paths for quality of service support.

Allows real time traffic to go through a fast virtual path with higher priority.

Allows normal traffic to go through normal virtual path with intermediate priority to prevent blocking out of real time traffic.

Allows IPSec traffic to go through slow virtual path with a lower priority to prevent head of line blocking.

Intermediate and lower priority virtual paths each have a timeout counter to prevent starvation and guarantee forward progress.

Intermediate priority virtual path timeout counter will start counting down if there is any packet in the intermediate priority virtual path buffer. Upon detecting timeout, higher priority traffic will be preempted to service the intermediate priority traffic.

Lower priority virtual path timeout counter will start counting down if there is any packet in lower priority virtual path buffer. Upon detecting timeout, either higher priority traffic or intermediate priority traffic will be preempted to service lower priority traffic.

If timeout occurs on more than one virtual paths, intermediate priority traffic will be serviced followed by lower priority traffic.

Further, in the mode in which the transmit packet buffer is managed with dynamic allocation of memory for the virtual paths, the invention provides additional unique features, including:

Allows a single memory to be used more efficiently to support all virtual path buffers.

Available buffers on each virtual path can be indicated through a free buffer list.

Used buffers for each virtual path can be constructed through a used buffer list.

Packet downloaded into each virtual path can follow free buffer list to store packet data into non-contiguous memory locations.

Packet transmitted from each virtual path can follow used buffer list to read out packet data from non-contiguous memory locations.

Each used buffer can be released as soon as the corresponding packet data are transmitted out of its virtual path.

Buffers used in slow virtual path won't block higher priority and intermediate priority traffic flow, even with a single memory used to implement all virtual path buffers.

Used buffer to be released can be appended onto the tail of the free list for the virtual path with the least amount of free buffers.

More buffers can be allocated to the virtual path with the most amount traffic. Less buffers can be allocated to the virtual path with the least amount of traffic.

A minimum number of buffers in single memory can be used to achieve the maximum efficiency of memory usage for quality of service support.

In general, quality of service levels are supported by virtual paths in high performance network interfaces.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A computer system, comprising:
    a host processor, and
    a network interface coupled to the host processor and to a network, the network interface comprising:
        a first port that receives data from the host processor;
        a second port that transmits data to the network;
        a memory that stores data packets received by the first port, the memory being coupled to the first port and to the second port; and
        a control circuit that manages the memory as a plurality of queues having respective priorities, including logic to place a packet received from the host into one of the plurality of queues according to a quality of service parameter associated with the packet, and logic to serve packets in the plurality of queues according to the respective priorities,
    wherein the plurality of queues includes a higher priority queue, and a lower priority queue, and including timeout logic coupled with the lower priority queue which is enabled if a packet is stored in the lower priority queue and preempts the higher priority queue in favor of the lower priority queue if the timeout timer expires.

2. The computer system of claim 1, wherein the plurality of queues includes an intermediate priority queue, and said timeout logic includes
    a first timeout timer coupled with the intermediate priority queue which is enabled if a packet is stored in the intermediate priority queue and expires after a first timeout interval, and including logic to preempt the higher priority queue in favor of the intermediate priority queue if the first timeout timer expires; and
    a second timeout timer coupled with the lower priority queue which is enabled if a packet is stored in the lower priority queue and expires after a second timeout interval, and including logic to preempt the higher priority queue and the intermediate priority queue in favor of the lower priority queue if the second timeout timer expires.

3. The computer system of claim 1, wherein the plurality of queues includes an intermediate priority queue, and said timeout logic includes
    an first timeout timer coupled with the intermediate priority queue which is enabled if a packet is stored in the intermediate priority queue and expires after a first timeout interval, and including logic to preempt the higher priority queue in favor of the intermediate priority queue if the first timeout timer expires;
    a second timeout timer coupled with the lower priority queue which is enabled if a packet is stored in the lower priority queue and expires after a second timeout interval, and including logic to preempt the higher priority queue and the intermediate priority queue in favor of the lower priority queue if the second timeout timer expires; and
    logic to service the intermediate priority queue in favor of the lower priority queue if both the first and second timeout timers expire.

4. The computer system of claim 1, further comprising logic in the network interface to execute a security process on packets in one of the plurality of queues.

5. The computer system of claim 1, wherein the second port further comprises circuitry for formatting packets according to a protocol compliant with an Ethernet protocol standard.

6. The computer system of claim 1, wherein the second port further comprises circuitry for formatting packets according to a protocol compliant with an Infiniband protocol standard.

7. The computer system of claim 1, wherein the packets include frame start headers, and said quality of service parameters comprises codes in the frame start headers.

8. The computer system of claim 1, wherein said plurality of queues have statically allocated space in said memory.

9. The computer system of claim 1, wherein said plurality or queues include first, second and third queues, and said memory includes a first storage array for the first queue, a second storage array for the second queue, and a third storage array for the third queue, and wherein said first, second and third storage arrays have respective inputs coupled to said logic to place a packet in one of the plurality of queues, and respective outputs, and wherein said logic to service packets in the plurality of queues includes a multiplexer coupled to the outputs of the first, second and third storage arrays.

10. The computer system of claim 1, wherein at least one of the queues in the plurality of queues comprises a first-in-first-out FIFO queue.

11. A method for managing transfer of data packets between a host processor and a network, comprising:
    managing memory in the network interface apparatus as a plurality of queues having respective priorities, including placing a packet received from the host processor into one of the plurality of queues according to a quality of service parameter associated with the packet, and servicing packets in the plurality of queues according to the respective priorities, wherein the plurality of queues includes a higher priority queue, and a lower priority queue, and including preempting the higher priority queue in favor of the lower priority queue if a packet in the lower priority queue is blocked by processes executing on packets in the higher priority queue for a timeout interval.

12. The method of claim 11, wherein the plurality of queues includes an intermediate priority queue, and including enabling a first timeout timer coupled with the intermediate priority queue if a packet is stored in the intermediate priority queue, the first timeout timer expiring after a first timeout interval, and preempting the higher priority queue in favor of the intermediate priority queue if the first timeout timer expires; and enabling a second timeout timer coupled with the lower priority queue if a packet is stored in the lower priority queue, the second timeout timer expiring after a second timeout interval, and preempting the higher priority queue and the intermediate priority queue in favor of the lower priority queue if the second timeout timer expires.

13. The method of claim 11, wherein the plurality of queues includes an intermediate priority queue, and including enabling a first timeout timer coupled with the intermediate priority queue if a packet is stored in the intermediate priority queue, the first timeout timer expiring after a first timeout interval, and preempting the higher priority queue in favor of the intermediate priority queue if the first timeout timer expires; and enabling a second timeout timer coupled with the lower priority queue if a packet is stored in the lower priority queue, the second timeout timer expiring after a second timeout interval, and preempting the higher priority queue and the intermediate priority queue in favor of the lower priority queue if the second timeout timer expires; and servicing the intermediate priority queue in favor of the lower priority queue if both the first and second timeout timers expire.

14. The method of claim 11, further comprising executing a security process on packets in one of the plurality of queues.

15. The method of claim 11, including formatting packets in the network interface device according to a protocol compliant with an Ethernet protocol standard.

16. The method of claim 11, including formatting packets in the network interface device packets according to a protocol compliant with an Infiniband protocol standard.

17. The method of claim 11, wherein the packets include frame start headers, and said quality of service parameters comprises codes in the frame start headers.

18. The method of claim 11, wherein said plurality of queues have statically allocated space in said memory.

19. The method of claim 11, wherein said plurality of queues include first, second and third queues, and said network interface device includes memory comprising a first storage array for the first queue, a second storage array for the second queue, and a third storage array for the third queue, and including servicing packets in the plurality of queues using a multiplexer in the network interface device coupled to the outputs of the first, second and third storage arrays.

20. The method of claim 11, including managing at least one of the queues in said plurality of queues as a FIFO queue.

21. An integrated circuit for use in a network interface between a host processor and a network, comprising:

a first port that receives data from the host processor;

a second port that transmits data to the network;

a memory that stores data packets received by the first port, the memory being coupled to the first port and to the second port; and a control circuit that manages the memory as a plurality of queues having respective priorities, including logic to place a packet received on the first port into one of the plurality of queues according to a quality of service parameter associated with the packet, logic to transmit packets in the plurality of queues out the second port according to the respective priorities, wherein the plurality of queues includes a high priority queue, and a lower priority queue, and including timeout logic coupled with the lower priority queue which is enabled if a packet is stored in the lower priority queue and preempts the higher priority queue in favor of the lower priority queue if the timeout timer expires.

22. The integrated circuit of claim 21, wherein the plurality of queues includes, an intermediate priority queue, and said timeout logic includes a first timeout timer coupled with the intermediate priority queue which is enabled if a packet is stored in the intermediate priority queue and expires after a first timeout interval, and including logic to preempt the higher priority queue in favor of the intermediate priority queue if the first timeout timer expires; and a second timeout timer coupled with the lower priority queue which is enabled if a packet is stored in the lower priority queue and expires after a second timeout interval, and including logic to preempt the higher priority queue and the intermediate priority queue in favor of the lower priority queue if the second timeout timer expires.

23. The integrated circuit of claim 21, wherein the plurality of queues includes, an intermediate priority queue, and said timeout logic includes an first timeout timer coupled with the intermediate priority queue which is enabled if a packet is stored in the intermediate priority queue and expires after a first timeout interval, and including logic to preempt the higher priority queue in favor of the intermediate priority queue if the first timeout timer expires;

a second timeout timer coupled with the lower priority queue which is enabled if a packet is stored in the lower priority queue and expires after a second timeout interval, and including logic to preempt the higher priority queue and the intermediate priority queue in favor of the lower priority queue if the second timeout timer expires; and logic to service the intermediate priority queue in favor of the lower priority queue if both the first and second timeout timers expire.

24. The integrated circuit of claim 21, further comprising logic in the network interface to execute a security process on packets in one of the plurality of queues.

25. The integrated circuit of claim 21, wherein the second port further comprises media access control circuitry for transmitting packets according to a protocol compliant with an Ethernet protocol standard.

26. The integrated circuit of claim 21, wherein the second port further comprises media access control circuitry for transmitting packets according to a protocol compliant with an Infiniband protocol standard.

27. The integrated circuit of claim 21, wherein the packets include frame start headers, and said quality of service parameters comprises codes in the frame start headers.

28. The integrated circuit of claim 21, wherein said plurality of queues have statically allocated space in said memory.

29. The integrated circuit of claim 21, wherein said plurality of queues include first, second and third queues, and said memory includes a first storage array for the first queue, a second storage array for the second queue, and a third storage array for the third queue, and wherein said first, second and third storage arrays have respective inputs coupled to said logic to place a packet in one of the plurality of queues, and respective outputs, and wherein said logic to service packets in the plurality of queues includes a multiplexer coupled to the outputs of the first, second and third storage arrays.

30. The integrated circuit of claim 21, at least one of the queues in the plurality of queues comprises a FIFO queue.

* * * * *